US007273506B2

(12) United States Patent
Oh et al.

(10) Patent No.: US 7,273,506 B2
(45) Date of Patent: Sep. 25, 2007

(54) CYCLONE DUST COLLECTING APPARATUS AND VACUUM CLEANER USING THE SAME

(75) Inventors: Jang-keun Oh, Gwangju (KR); Jung-gyun Han, Busan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 423 days.

(21) Appl. No.: 10/959,694

(22) Filed: Oct. 6, 2004

(65) Prior Publication Data

US 2005/0251951 A1 Nov. 17, 2005

(30) Foreign Application Priority Data

May 12, 2004 (KR) ...................... 10-2004-0033570

(51) Int. Cl.
*B01D 45/12* (2006.01)
(52) U.S. Cl. ..................... 55/343; 55/349; 55/426; 55/429; 55/459.1; 55/DIG. 3; 15/350; 15/353
(58) Field of Classification Search ............... 55/343, 55/346, 349, 426, 429, 459.1, DIG. 3; 15/350, 15/353
See application file for complete search history.

(56) References Cited

U.S. PATENT DOCUMENTS

| 4,316,729 | A | 2/1982 | Mac Lean et al. | |
|---|---|---|---|---|
| 5,145,499 | A | 9/1992 | Dyson | |
| 5,275,641 | A | 1/1994 | Tammera et al. | |
| 6,238,451 | B1 | 5/2001 | Conrad et al. | |
| 6,810,557 | B2 * | 11/2004 | Hansen et al. | ................. 15/353 |
| 7,128,770 | B2 * | 10/2006 | Oh et al. | ................. 55/343 |
| 2001/0054213 | A1 | 12/2001 | Oh et al. | |
| 2006/0123590 | A1 * | 6/2006 | Fester et al. | ................. 15/353 |

FOREIGN PATENT DOCUMENTS

| CN | 1296801 | 5/2001 |
|---|---|---|
| CN | 1312049 | 9/2001 |
| CN | 1410026 | 4/2003 |
| CN | 1492742 | 4/2004 |
| DE | 20109699 | 6/2001 |
| EP | 0885585 | 12/1998 |
| FR | 2619498 | 2/1989 |
| GB | 2372435 | 8/2002 |
| GB | 2406064 | 3/2005 |
| GB | 2406065 | 3/2005 |
| GB | 2406066 | 3/2005 |
| GB | 2406067 | 3/2005 |
| JP | 5214775 | 2/1977 |
| JP | 2-244206 | 9/1990 |
| JP | 2002 51947 | 2/2002 |
| JP | 2002-213920 | 7/2002 |
| JP | 2004-57798 | 2/2004 |
| KR | 000074149 | 12/2000 |
| SE | 671221 | 4/1952 |
| WO | WO02 067756 | 9/2002 |

* cited by examiner

*Primary Examiner*—Robert A. Hopkins
(74) *Attorney, Agent, or Firm*—Ladas & Parry LLP

(57) ABSTRACT

A cyclone dust-collecting apparatus comprises a cyclone body having a first cyclone part and a second cyclone part comprising a plurality of cones, a cover unit connected with the upper portion of the cyclone body for guiding air movement between the first cyclone part and the second cyclone part, and a contaminant receptacle connected with the lower portion of the cyclone body for collecting contaminants separated from the first and second cyclone parts.

10 Claims, 4 Drawing Sheets

CYCLONE DUST COLLECTING APPARATUS AND VACUUM CLEANER USING THE SAME

CROSS-REFERENCE TO RELATED APPLICATIONS

This application claims the benefit of Korean Patent Application No. 2004-33570 filed on May 12, 2004, in the Korean Intellectual Property Office, the disclosure of which is incorporated herein by reference in its entirety.

BACKGROUND OF THE INVENTION

1. Field of the Invention

The present invention relates generally to a cyclone dust collecting apparatus and a vacuum cleaner using the same, and more particularly to a cyclone dust-collecting apparatus having dual cyclone divisions for providing a compact and efficient construction.

2. Description of the Background Art

Generally, a vacuum cleaner comprises a main body in which a driving source is mounted, a suction brush connected with the main body for drawing in dust from a surface to be cleaned, and a hose or a connecting pipe connecting the suction brush and the main body. An upright-type vacuum cleaner may have the suction brush directly connected with the main body.

The main body has a driving source, such as a driving motor, and a filtering device for filtering dust from the air drawn into the vacuum cleaner. The main body comprises a driving chamber in which the driving motor is mounted, and a dust-collecting chamber in which the filtering device is mounted.

A dust filter, such as a dust bag, which is detachably mounted in the dust chamber, can be applied as the filtering device. However, a user must necessarily manually touch and pick up such dust bag in order to remove the contaminants and so to reuse the bag, which is unsanitary. To overcome the above drawbacks, a disposable filtering means, such as a disposable dust bag, can be used. However, use of consumable disposable dust bags increases the costs of maintenance.

Accordingly, a cyclone dust-collecting apparatus, which can compensate for the above-mentioned weaknesses resulting from use of conventional dust bags, and which is capable of collecting dust and contaminants, is required.

SUMMARY OF THE INVENTION

The present invention has been conceived to solve the above-mentioned problems occurring in the prior art, and an aspect of the present invention is to provide a cyclone dust-collecting apparatus having a simple structure and superior ability of collecting dust, and a vacuum cleaner using the same.

In order to achieve the above aspects, there is provided a cyclone dust collecting apparatus comprising: a cyclone body having a first cyclone part and a second cyclone part, the second cyclone part comprising a plurality of cones, a cover unit connected with the upper portion of the cyclone body for guiding air movement between the first cyclone part and the second cyclone part, and a contaminant receptacle connected with the lower portion of the cyclone body for collecting contaminants separated from the air in the first and second cyclone parts.

The cover unit may comprise a first cover member having a centrifugal path for directing the air exhausted from the first cyclone part toward the second cyclone part, and a second cover member having an exhaust port for exhausting air from the second cyclone part, the second cover member being connected with the upper portion of the first cover for providing mixing and circulating of exhaust air in a chamber defined by the second cover member.

The number of the centrifugal paths may correspond to the number of the plurality of cones.

The first cyclone part may have a larger diameter than the second cyclone part to enable collection of large-sized contaminants.

The first cyclone part may comprise an air inlet through which air containing contaminants flows and a grill member mounted at an upper portion of a centrifugal separation chamber.

The contaminant receptacle may comprise a first chamber corresponding to the first cyclone part, and a second chamber corresponding to the second cyclone member, the second chamber being formed separate from the first chamber.

The first chamber may be formed in the configuration of a cylinder corresponding in shape to the first cyclone part.

A flow restraint member may be provided in the first chamber to prevent the collected contaminants from circulating in the first chamber.

The second cyclone part preferably has two cones, each having the essentially same shape and size.

In order to achieve the above aspects, there is also provided a vacuum cleaner comprising: a cleaner body having a driving motor for providing suction force, a suction brush connected with the cleaner body for drawing contaminants from the surface to be cleaned, and a cyclone dust-collecting apparatus mounted in the cleaner body for separating contaminants from the air drawn in from the suction brush, and the cyclone dust-collecting apparatus further comprises a cyclone body having a first cyclone part and a second cyclone part, the second cyclone comprising a plurality of cones, a cover unit connected with the upper portion of the cyclone body, for directing movement of the air between the first cyclone part and the second cyclone part, and a contaminant receptacle connected with the lower portion of the cyclone body for collecting contaminants separated from the air in the first and second cyclone parts.

BRIEF DESCRIPTION OF THE DRAWINGS

The above and other aspects, features and advantages of the present invention will become more apparent upon achieving an understanding of the following detailed description with reference to the accompanying drawings, in which.

DETAILED DESCRIPTION OF THE PREFERRED EMBODIMENTS

Figure 1:
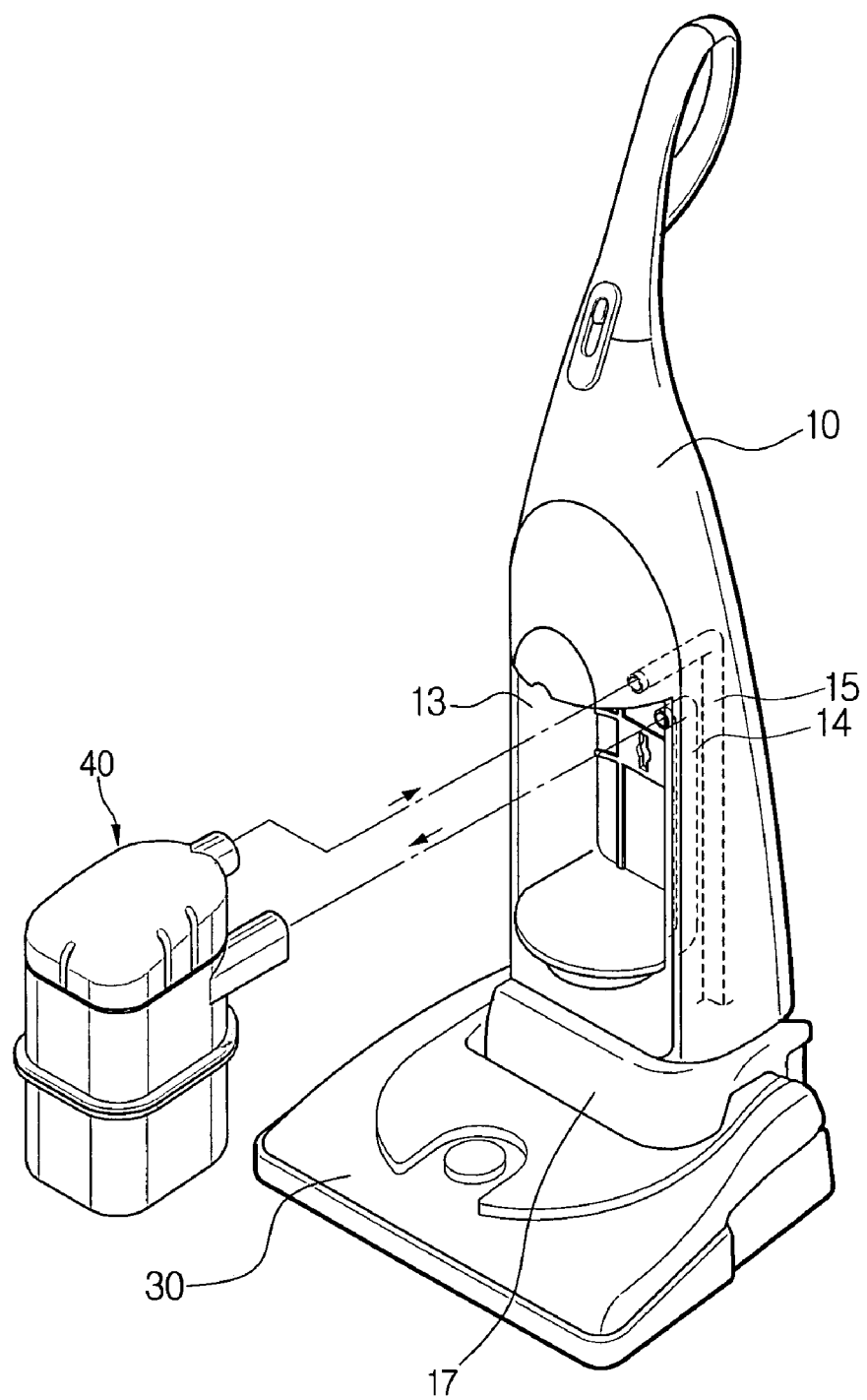
FIG. 1 is a partially exploded, perspective view of a vacuum cleaner applying a cyclone dust-collecting apparatus according to an embodiment of the present invention.

Certain embodiments of the present invention will be described in greater detail with reference to the accompanying drawings.

In the following description of the drawing figures, identical drawing reference numerals are used for indicating the same or similar elements between different drawing figures. The elements and functions defined in the description, such as the construction and structural elements, are to be considered illustrative only, and are provided to assist in a comprehensive understanding of the invention. Thus, it is apparent that the present invention can be carried out without use of some or all of the defined elements. Also, well-known functions or constructions are not described in detail to avoid obscuring the invention in unnecessary detail.

Referring to FIG. 1, a vacuum cleaner according to an embodiment of the present invention comprises a main body 10, a suction brush 30 and a cyclone dust collecting apparatus 40. A driving source such as a motor (not shown) is mounted in the main body 10 to provide suction force. For this, the main body 10 includes a driving chamber 17 in which the driving motor is mounted, and a dust-collecting chamber 13 connected and in fluid communication with the driving chamber 17. The cyclone dust-collecting apparatus 40 is mounted in the dust-collecting chamber 13.

The suction brush 30 draws in air and contaminants from a surface to be cleaned by suction force generated by the driving motor. An inflow path 14 in the form of a pipe is formed for transport of the air and contaminants drawn in through the suction brush toward the dust chamber 13, that is, into the cyclone dust-collecting apparatus 40. A discharge path 15 connects the dust chamber 13 and the driving motor, so that clean air filtered by the cyclone dust-collecting apparatus 40, can be properly discharged out of the vacuum cleaner. The cyclone dust-collecting apparatus is connected between the inflow path 14 and the discharge path 15, and therefore, the suction force of the driving motor can be transmitted to the suction brush 30.

The cyclone dust-collecting apparatus 40 separates the contaminants from the air drawn in through the suction brush 30, by centrifugal separation. Specifically, the cyclone dust-collecting apparatus 40 collects and stores the contaminants, and discharges clean air to the outside environment through the driving motor. The cyclone dust-collecting apparatus 40 is detachably mounted in the dust chamber 13. The method and means for attaching and detaching the cyclone dust-collecting apparatus 40 are not significant with respect to the present invention, and so a detailed description thereof will be omitted. The cyclone dust-collecting apparatus 40 can be attached to the main body 10 by use of various and generally known methods and structures.

Figure 2:
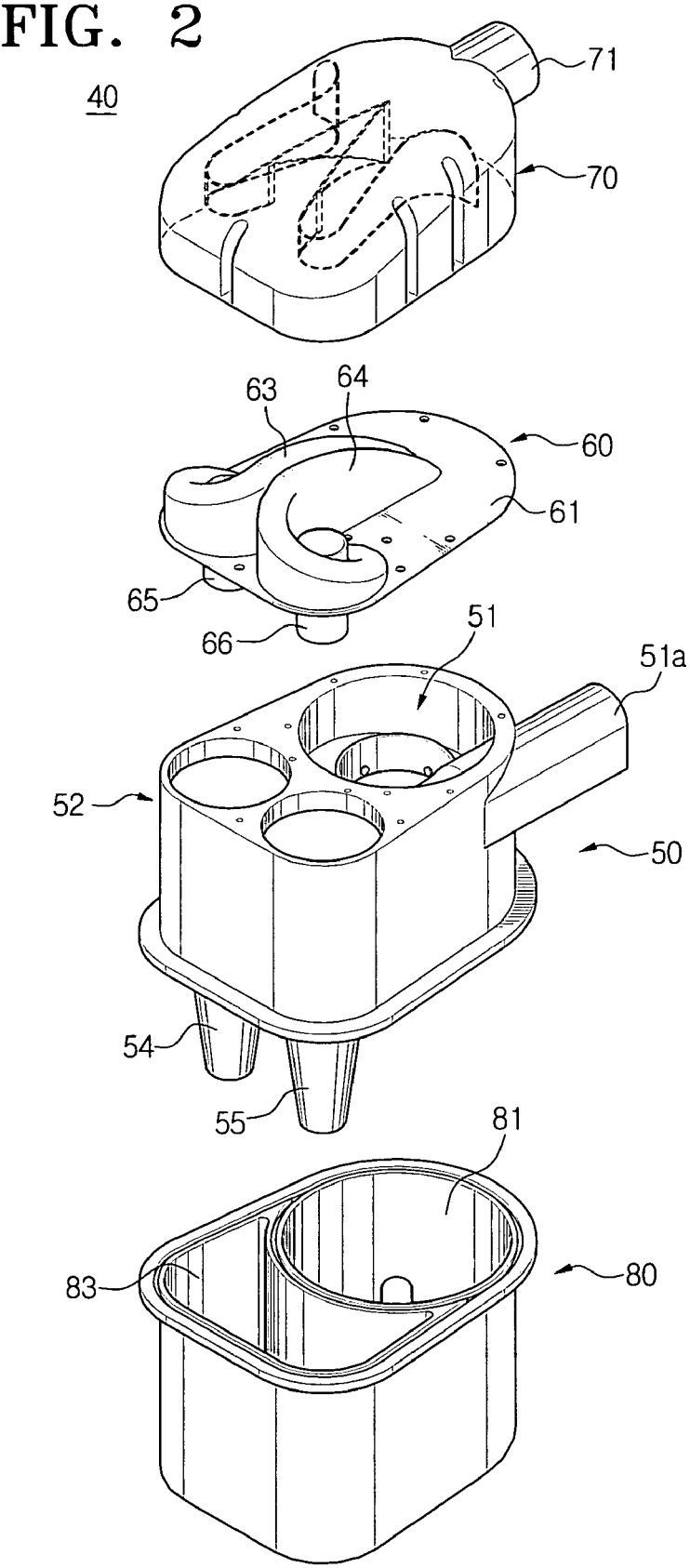
FIG. 2 is an exploded perspective view of the cyclone dust-collecting apparatus shown in FIG. 1.
Figure 3:
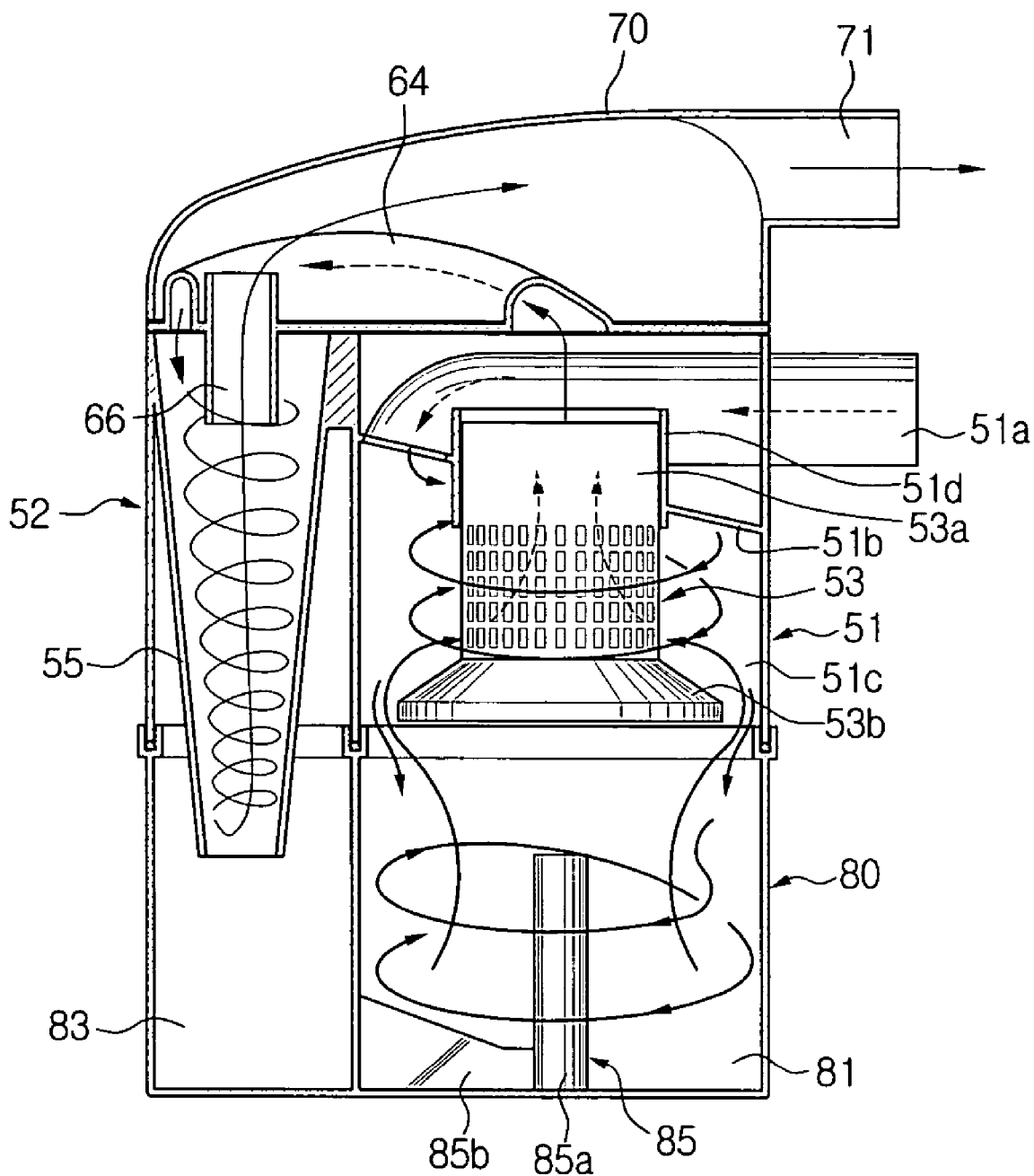
FIG. 3 is a cross-sectional view of the assembled cyclone dust-collecting apparatus shown in FIG. 2.

Referring now to FIGS. 2 and 3, the cyclone dust-collecting apparatus 40 comprises a cyclone main body 50, cover units 60 and 70 attached to the upper portion of the cyclone main body 50, and a contaminant receptacle 80 connected with the lower portion of the cyclone main body 50.

The cyclone main body 50 comprises a first cyclone part 51 and a second cyclone part 52. An air inlet 51a is connected to the first cyclone part 51, and air containing contaminants flow into the first cyclone part 50 through the air inlet 51a. The air inlet 51a is connected to the inflow path 14 of FIG. 1. The air flowing in through the air inlet 51a is guided along the inclined guide part 51b to a centrifugal separation chamber 51c (FIG. 3). A grill member 53 is mounted in the first cyclone part 51 to be substantially centrally disposed therein. The grill member 53 comprises a cylindrical grill body 53a disposed on a central portion of the first cyclone part 51, and a skirt 53b extending from the lower portion of the grill body 53a. Plural minute apertures are configured in the grill body 53a. As such, the air flows in via the air inlet 51a and is centrifugally separated in the first cyclone part 51 such that relatively large-sized contaminants are separated out and fall by action of gravity. Clean air is passed through the minute apertures of the grill body 53a and is discharged out through the top part of the grill member 53, as shown by the arrows in phantom. A mounting part 51d, is integrally formed with the inclined guide part 51b, and provides a mount to connect with the grill member 53 and the air inlet 51A.

Figure 4:
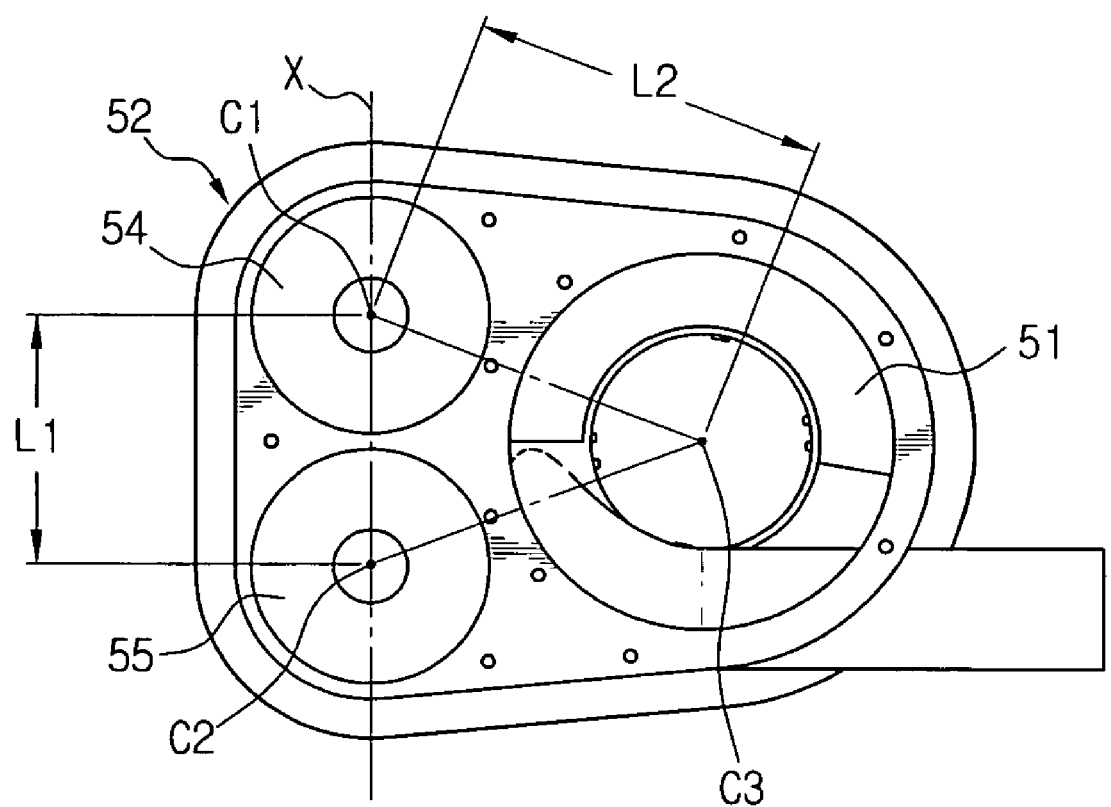
FIG. 4 is a plan view of the cyclone body shown in FIG. 2.

The second cyclone part 52 provides a secondary filter for the air that was filtered in the first cyclone part 51. The second cyclone part 52 comprises a plurality of, preferably two, cyclone cones 54 and 55. Each of the cyclone cones 54 and 55 are configured to have the same height, and the two cones 54, 55 are integrally formed with each other in a side-by-side configuration. The second cyclone part 52 and the first cyclone part 51 are arranged one at the left and the other at the right of a center line, respectively, each occupying substantially equal areas. Specifically, the first cyclone part 51 and the second cyclone part 52 differ only in the filtering order, but are arranged side by side. More particularly, as shown in the plan view of FIG. 4, the first and second cyclone parts 51 and 52 are so disposed that an imaginary line X connecting the center c1 and c2 of the cones 54 and 55 of the second cyclone part 52 does not overlap with the first cyclone part 51. The distance L1 between the centers c1, c2 of each cone 54, 55, respectively, may be shorter than or equal to the distance L2 between one of the centers c1 or c2 and the center c3 of the first cyclone part 51. With the cyclone body 50 formed with the above described configuration, the cyclone dust collecting apparatus 40 can be compact-sized, and filtering efficiency increases because of the successive primary and secondary filtering operations.

The cover units 60 and 70 are divided into a first cover member 60 and a second cover member 70. The first cover member 60 guides air discharged from the first cyclone part 51 toward the second cyclone part 52. The first cover member 60 comprises a plate-like cover body 61 that is configured to be connected with the upper portion of the cyclone body 50, and a pair of centrifugal paths 63 and 64 configured on the first cover member 60, for leading the air discharged from the grill member 53 toward each of the first and second cyclone cones 54 and 55 for secondary centrifugal separation of the smaller dust particles. A pair of the centrifugal paths 63 and 64 are preferably integrally formed with the cover body 61, and are a mirror image of each other. The cover member 60 comprises a pair of downwardly extending air exhaust ports 65 and 66. The air exhaust ports 65 and 66 correspond to and receive air from the first and second cyclone cones 54 and 55, respectively. Air, once dust has been separated therefrom, is directed from the second cyclone part 52 and is discharged through the air exhaust ports 65 and 66.

The second cover member 70 is configured and oriented to cover the first cover member 60. The second cover member 70 provides a place for air discharged from the first and second exhaust ports 65 and 66 to be remixed with the air discharged from the other port, and provides a chamber for the air to be retained for a predetermined interval of time. Accordingly, noise from the high-speed air can be reduced by the second cover member 70, which acts somewhat like a muffler. The second cover member 70 comprises a final exhaust port 71 for discharging the cleaned air. The final exhaust port 71 may be directly or indirectly connected with the driving motor to obtain suction force therefrom. That is, the final exhaust port 71 is preferably connected to the discharge path 15 (FIG. 1).

The contaminants receptacle 80 fits snugly under and is connected with the lower portion of the cyclone body 50. The contaminants receptacle 80 comprises a first chamber 81 for collecting contaminants from the first cyclone part 51, and a second chamber 83 for collecting contaminants from the second cyclone part 52. The first chamber 81 is formed in the configuration of a cylinder, such that the centrifugal movement of the air stream in the first cyclone part 51 can be maintained to a certain extent. The second chamber 83 may take the configuration of a non-cylinder, in proper sizes and shapes. A flow restraint member 85 preferably is provided in the first chamber 81, for preventing the collected contaminants from circulating within first chamber 81. The flow restraint member 85 comprises a pillar 85a protruding substantially from a central location and extending from the bottom surface of the first chamber 81. A partition 85b is disposed between the pillar 85a and an inner wall of the first chamber 81. The pillar 85a prevents the collected contaminants from ascending with the ascending portion of the cyclone air stream, shown by the solid arrows. The partition 85b prevents the contaminants from rotating and moving on the bottom surface of the first chamber 81, and so delays the momentum of the solid contaminants sufficiently for gravity to act on them, thereby causing the contaminants to fall to the bottom surface.

The operation of a vacuum cleaner having a cyclone dust-collecting apparatus according to an embodiment of the present invention will be explained as follows.

When the driving motor (not shown) is driven, suction force is generated. The suction force is transmitted via the cyclone dust-collecting apparatus 40 to the suction brush 20 (FIG. 1). The suction brush 20 draws in air, in which contaminants are entrained, from the surface to be cleaned. The drawn in air flows into the cyclone dust-collecting apparatus 40 via the air inflow path 14 of FIG. 1.

Relatively large-sized contaminants are separated from the air drawn into the air inlet 51a in the first cyclone part 51 by centrifugal operation of the air stream, as shown in FIG. 3. The separated contaminants fall to the bottom surface of first chamber 81 to be collected and disposed of by the user. The cleaned air is then discharged via the grill member 53, and is directed by the first and second centrifugal paths 63 and 64 into the second cyclone part 52.

Minute dust particles entrained in the drawn in air are separated by centrifugal separation operation and fall in a downward direction in the cyclone cones 54 and 55 of the second cyclone part 51, and the minute dust particles are collected in the second chamber 83. The clean air from each of the cyclone cones 54 and 55 is then discharged via each of the exhaust ports 65 and 66 towards the second cover member 70. Discharge of the air gathered within the second cover member 70 is delayed for a predetermined time by the mixing and circulating thereof in a chamber defined by the second cover member 70, and is discharged via the final exhaust port 71 and through the discharge path 15 to the driving motor.

As described above, a cyclone dust collecting apparatus 40 and a vacuum cleaner using the same according to an embodiment of the present invention comprises the first and second cyclone parts 51 and 52, and therefore, the air can be cleaned in a sequential process, comprising a primary centrifugal separation in the first cyclone part 51 and a secondary centrifugal separation in the second cyclone part 52.

The first cyclone part 51 filters large-sized contaminants by a stronger centrifugal force, and the second cyclone part 52 cleans smaller-sized contaminants in a plurality of cones wherein a comparatively weaker centrifugal force is generated.

Using a vacuum cleaner having a dust-collecting apparatus 40 according to the above structure, energy consumption and cleaning efficiency increases.

Additionally, the first cyclone part 51 and the second cyclone part 52 are arranged to be complementary to each other, and specifically, to occupy substantially equal amounts of area, and thus, the cleaning efficiency can increase and the size of the apparatus can be made more compact.

Additional advantages, objects, and features of the embodiments of the invention are set forth in part in the description above, and in part will become apparent to those having ordinary skill in the art upon achieving an understanding thereof, or may be learned from practice of the invention. The objects and advantages of the embodiments of the invention may be realized and attained as more particularly pointed out in the appended claims.

What is claimed is:

1. A cyclone dust-collecting apparatus, comprising:
   a cyclone body having a first cyclone part and a second cyclone part, the second cyclone part comprising a plurality of cones and wherein the first cyclone part has a larger diameter than the second cyclone part;
   a cover unit connected with the upper portion of the cyclone body for directing air movement between the first cyclone part and the second cyclone part, the cover unit comprising:
   a first cover member having a centrifugal path that directs air exhausted from the first cyclone part toward the second cyclone part; and
   a second cover member having an exhaust port for exhausting air from the second cyclone part, the
   second cover member being connected with the upper portion of the first cover for providing mixing and circulating of exhaust air in a chamber defined by the second cover member; and
   a contaminant receptacle connected with the lower portion of the cyclone body for collecting contaminants separated from the air in the first and second cyclone parts.

2. The cyclone dust-collecting apparatus according to claim 1, wherein the number of the centrifugal paths corresponds to the number of plurality of cones.

3. The cyclone dust-collecting apparatus according to claim 1, wherein the first cyclone part further comprises:
   an air inlet through which air containing contaminants flows; and
   a grill member mounted at an upper portion of a centrifugal separation chamber.

4. The cyclone dust-collecting apparatus according to claim 1, wherein the contaminant receptacle further comprises:
   a first chamber corresponding to the first cyclone part; and
   a second chamber corresponding to the second cyclone part, the second chamber being formed separate from the first chamber.

5. The cyclone dust-collecting apparatus according to claim 4, wherein the first chamber is formed in the configuration of a cylinder corresponding in shape to the first cyclone part.

6. The cyclone dust-collecting apparatus according to claim 4, wherein a flow restraint member is provided in the first chamber to prevent the collected contaminants from circulating within the first chamber.

7. The cyclone dust-collecting apparatus according to claim 1, wherein the second cyclone part has two cones having essentially the same shape and size.

8. The cyclone dust-collecting apparatus according to claim 1, wherein the first and second cyclone parts are arranged so that an imaginary line connecting the centers of the cones of the second cyclone part does not overlap the first cyclone pad.

9. The cyclone dust-collecting apparatus according to claim 1, wherein the distance between the centers of each of the cones of the second cyclone part is shorter than or equal to the distance between one of the centers and the center of the first cyclone part.

10. A vacuum cleaner, comprising:
- a cleaner body having a driving motor for providing suction force;
- a suction brush connected with the cleaner body for drawing contaminants from a surface to be cleaned; and
- a cyclone dust-collecting apparatus mounted in the cleaner body for separating contaminants from the air drawn in from the suction brush, the cyclone dust-collecting apparatus comprising:
  - a cyclone body having a first cyclone part and a second cyclone part, the second cyclone pad including a plurality of cones, wherein the first cyclone part has a larger diameter than the second cyclone part to enable collection of larger-sized contaminants;
  - a cover unit connected with the upper portion of the cyclone body, and for directing the movement of air between the first cyclone part and the second cyclone part, a cover unit connected with the upper portion of the cyclone body for directing air movement between the first cyclone part and the second cyclone part, the cover unit further comprising:
    - an air path that directs air exhausted from the first cyclone part toward the second cyclone part; and
    - an exhaust port that exhausts air from the second cyclone part, the exhaust port being connected with an upper portion of the cover unit for providing mixing and circulating of exhaust air in a chamber defined by the exhaust port; and
  - a contaminant receptacle connected with the lower portion of the cyclone body for collecting contaminants separated from the air in the first and second cyclone parts.

* * * * *